(12) United States Patent
Hatfield et al.

(10) Patent No.: US 12,321,315 B1
(45) Date of Patent: Jun. 3, 2025

(54) FILE SYSTEM DELTA VISUALIZATION

(71) Applicant: INTERNATIONAL BUSINESS MACHINES CORPORATION, Armonk, NY (US)

(72) Inventors: Brian D. Hatfield, Tucson, AZ (US); Travis Jannsen, San Jose, CA (US); Runyu Jin, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 18/512,216

(22) Filed: Nov. 17, 2023

(51) Int. Cl.
*G06F 16/16* (2019.01)
*G06F 16/182* (2019.01)

(52) U.S. Cl.
CPC ........ *G06F 16/168* (2019.01); *G06F 16/1844* (2019.01)

(58) Field of Classification Search
CPC ............................ G06F 16/168; G06F 16/1844
See application file for complete search history.

(56) References Cited

U.S. PATENT DOCUMENTS

| | | | |
|---|---|---|---|
| 9,354,773 B2 | 5/2016 | Christensen | |
| 9,633,076 B1* | 4/2017 | Morton | G06F 16/284 |
| 2011/0261049 A1* | 10/2011 | Cardno | G06Q 40/04 |
| | | | 345/419 |
| 2013/0097554 A1* | 4/2013 | Wyeld | G06T 19/00 |
| | | | 715/782 |
| 2016/0210355 A1* | 7/2016 | Krantz, III | G06F 16/34 |
| 2017/0308545 A1 | 10/2017 | Soni | |
| 2019/0294587 A1 | 9/2019 | Prakash | |
| 2020/0159400 A1 | 5/2020 | Quinton | |
| 2022/0309066 A1* | 9/2022 | Morton | G06F 16/283 |

OTHER PUBLICATIONS

"FSV—the 3D File System Visualizer," sourceforge.net, Apr. 3, 2013, 2 pages.

* cited by examiner

*Primary Examiner* — Angelica Ruiz
(74) *Attorney, Agent, or Firm* — James L. Olsen

(57) ABSTRACT

Aspects of the present disclosure relate to file system delta visualization. A primary data set and a secondary data set can be received. A difference between the primary data set and the secondary data set can be determined. A determination can be made that a condition is met for file system delta visualization. The difference between the primary data set and the secondary data set can be visualized within a file system delta visualization representation.

20 Claims, 10 Drawing Sheets

FILE SYSTEM DELTA VISUALIZATION

BACKGROUND

The present disclosure relates generally to the field of computing, and in particular, to file system delta visualization.

A file system is a data structure that computer operating systems use to control data storage and retrieval. Each group of data stored in a file system is called a file. File systems can be formatted or otherwise configured for specific purposes (e.g., an optical disc versus a hard disk drive).

SUMMARY

Aspects of the present disclosure relate to a computer program product, system, and method for file system delta visualization.

Aspects of the present disclosure relate to a computer-implemented method comprising generating a file system delta visualization representation indicating differences between files of a primary data set and a secondary data set. The file system delta visualization representation is generated by visually representing a size of each file within the file system delta visualization representation, displaying a first subset of the files stored within the file system with a first visually distinguishing indicator indicating a modified status, the modified status indicating that files within the first subset of files are modified within the primary data set and not the secondary data set, and displaying a second subset of files stored within the file system with a second visually distinguishing indicator indicating an unmodified status, the unmodified status indicating that files within the second subset of files are unmodified within the primary data set and the secondary data set.

Aspects of the present disclosure relate to a system comprising one or more processors and one or more computer-readable storage media collectively storing program instructions which, when executed by the one or more processors, are configured to cause the one or more processors to perform a method. The method comprises generating a file system delta visualization representation indicating differences between files of a primary data set and a secondary data set. The file system delta visualization representation is generated by identifying a first group of files that have a modified status and a high priority status, identifying a second group of files that have a modified status and a low priority status, identifying a third group of files that have an unmodified status and a high priority status, identifying a fourth group of files that have an unmodified status and a low priority status, and visually distinguishing, within the file system delta visualization representation, the first, second, third, and fourth groups of files.

Aspects of the present disclosure relate to a computer program product comprising one or more computer readable storage media, and program instructions collectively stored on the one or more computer readable storage media, the program instructions comprising instructions configured to cause one or more processors to perform a method. The method comprises receiving a primary data set and a secondary data set, the secondary data set being a replicated version of the primary data set at a particular point in time. The method further comprises determining a difference between the primary data set and the secondary data set. The method further comprises determining that a condition is met for file system delta visualization. The method further comprises visualizing the difference between the primary data set and the secondary data set within a file system delta visualization representation.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
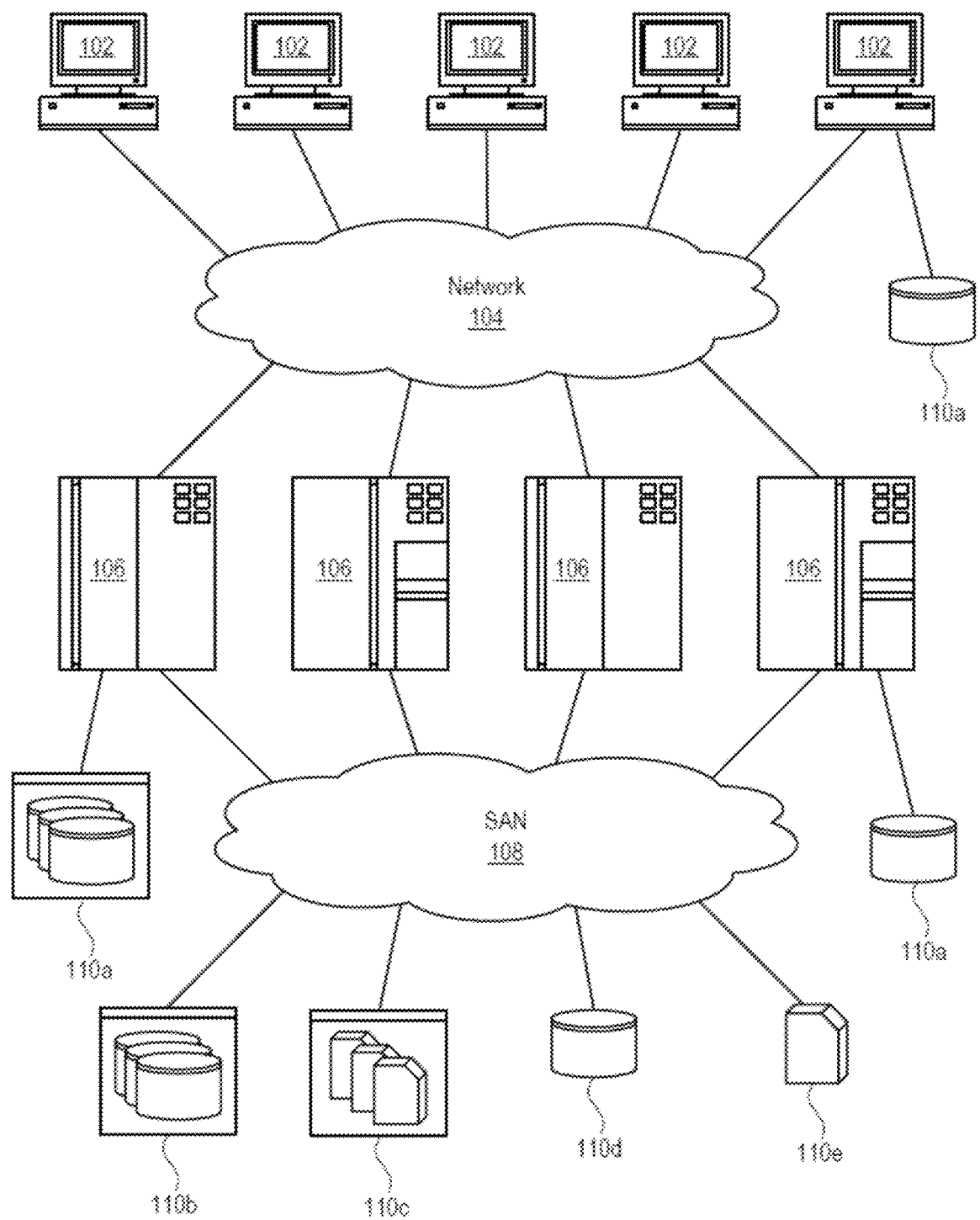
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to file system delta visualization. While the present disclosure is not necessarily limited to such applications, various aspects of the disclosure may be appreciated through a discussion of various examples using this context.

As discussed above, a file system is a data structure that computer operating systems use to control data storage and retrieval. Each group of data stored in a file system is called a file. File systems can be formatted or otherwise configured for specific purposes (e.g., an optical disc versus a hard disk drive).

Data replication allows the same data to be stored across multiple storage systems. A synchronous replication process writes data to a primary storage and a replica storage simultaneously, whereas an asynchronous replication process writes data to the primary storage first, and thereafter copies the data to the replica storage. Asynchronous replication has various benefits. Because the replicated data is written to the replica storage after it is already written to the primary storage, the performance and availability of the primary storage is not affected. Asynchronous replication can improve the performance of data replication by reducing the latency and bandwidth requirements of data transfer. However, because there is delay in writing the replicated data to the replica storage, if downtime occurs, there may be a difference (e.g., a delta) in the data stored on the primary storage as compared to the replica storage.

Downtime associated with a primary storage system can be expensive. It may be critical to rapidly make a decision regarding whether to recover the primary storage or failover to the replica storage to reduce expense associated with the failure. However, currently, there is no manner for a user to conveniently visualize the delta between the primary and replica storage systems in the event of a failure. Aspects of the present disclosure recognize the benefit of visualizing the delta between primary and replica storage systems in data replication environments. Aspects of the present disclosure also recognize the benefits of being able to generate visual delta representations between a first data set (e.g., a primary data set) and a secondary data set (e.g., a replica data set or back-up data set).

The following description provides examples of embodiments of the present disclosure, and variations and substitutions may be made in other embodiments. Several examples will now be provided to further clarify various aspects of the present disclosure.

Example 1: A computer-implemented method, where the method comprises generating a file system delta visualization representation indicating differences between files of a primary data set and a secondary data set. The file system delta visualization representation is generated by visually representing a size of each file within the file system delta visualization representation, displaying a first subset of the files stored within the file system with a first visually distinguishing indicator indicating a modified status, the modified status indicating that files within the first subset of files are modified within the primary data set and not the secondary data set, and displaying a second subset of files stored within the file system with a second visually distinguishing indicator indicating an unmodified status, the unmodified status indicating that files within the second subset of files are unmodified within the primary data set and the secondary data set.

The above limitations advantageously enable the visualization of differences between a primary data set (e.g., stored on primary storage) and a secondary data set (e.g., stored on secondary storage). This can enable a user to make a rapid and informed decision whether to recover a primary storage or failover to a replica storage in the event of failure of a storage system. This can reduce expense associated with failure of a storage system. Further, aspects may improve processing efficiency compared to other manners for file system visualization (e.g., where multiple file system views may be needed to be rendered for each respective data set). Further, aspects preserve computing resources by removing the need for manual comparison of replicated/backed-up storage system data. Further, aspects accurately convey differences between a primary data set and secondary data set.

Example 2: The limitations of Example 1, where the first visually distinguishing indicator further indicates a first priority status of the first subset of files. The above limitations advantageously enable a user to view the importance (e.g., priority) of files that have been modified within a file system delta visualization representation. This can aid the user in making a rapid and informed decision whether to recover a primary storage or failover to a replica storage in the event of failure of a storage system. For example, if the file system delta visualization representation indicates that high priority files have been modified within a primary data set and not a secondary data set, then the user may desire to recover the primary storage rather than failover to the secondary storage.

Example 3: The limitations of any of Examples 1-2, where the second visually distinguishing indicator further indicates a second priority status of the second subset of files. The above limitations advantageously enable a user to view the importance (e.g., priority) of files that have been modified within a file system delta visualization representation. This can aid the user in making a rapid and informed decision whether to recover a primary storage or failover to a replica storage in the event of failure of a storage system. For example, if the file system delta visualization representation indicates that high priority files have been modified within a primary data set and not a secondary data set, then the user may desire to recover the primary storage rather than failover to the secondary storage.

Example 4: The limitations of any of Examples 1-3, where files within the file system delta visualization representation are ordered based on at least one file attribute. The above limitations advantageously enable the ordering of files within a file system delta visualization representation. This can enhance processing efficiency within the file system delta visualization representation as input actions for navigating files within the file system delta visualization representation may be reduced. Further, because the file attribute that files within the file system delta visualization representation are ordered based on can vary, usability of the system can be enhanced, as a user can select a file attribute they desire to order the files based on.

Example 5: The limitations of any of Examples 1-4, where the at least one file attribute is selected from a group consisting of: file name, file size, and last modification time. The above limitations advantageously enable the ordering of files within a file system delta visualization representation. This can enhance processing efficiency within the file system delta visualization representation as input actions for navigating files within the file system delta visualization representation may be reduced. Further, because the file attribute that files within the file system delta visualization representation are ordered based on can vary, usability of the system can be enhanced, as a user can select a file attribute they desire to order the files based on.

Example 6: The limitations of any of Examples 1-5, where the at least one file attribute is the file name, where the file system delta visualization representation is a geometric shape having a plurality of rows and a plurality of columns, each unique row and column combination corresponding to a cell, where each cell corresponds to a storage size, and where files are alphabetically ordered in a snake fashion within the geometric shape. The above limitations advantageously enable the ordering of files based on name as displayed within a grid of cells, where each cell corresponds to storage size. This can enable a user to conveniently view files within a file system delta visualization representation that are alphabetically ordered in a shake fashion. Further, the size of files can be ascertained based on the number of cells the file occupies within the file system delta visualization representation.

Example 7: The limitations of any of Examples 1-6, where a third subset of files are displayed within the file system delta visualization representation, the third subset of files being new files added to the primary data set but not the secondary data set, the third subset of files displayed with a third visually distinguishing indicator. The above limitations advantageously enable the visualization of new files that have been added to a primary data set that have not yet been added to a replicated (e.g., secondary) data set. This can aid the user in making a rapid and informed decision whether to recover a primary storage or failover to a replica storage in the event of failure of a storage system. For example, if a new file (e.g., indicated as important) has been added to the primary data set, then recovery of the primary storage may be desirable as compared to failover to the replica storage which does not include the new file.

Example 8: The limitations of any of Examples 1-7, where the first visually distinguishing indicator is a first color and where the second visually distinguishing indicator is a second color. The above limitations advantageously enable a user to readily ascertain which files have a modified status and which files have an unmodified status based on color.

Example 9: The limitations of any of Examples 1-7, where the first visually distinguishing indicator is a first texture and where the second visually distinguishing indicator is a second texture. The above limitations advantageously enable a user to readily ascertain which files have a modified status and which files have an unmodified status based on texture.

Example 10: The limitations of any of Examples 1-9, where the method further comprises receiving a zoom-in input action and redisplaying the file system delta visualization representation with a zoomed in view in response to receiving the zoom-in input action. The above limitations advantageously enable a user to execute zoom actions to view different portions of the file system delta visualization representation in more detail.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 13: A system comprising one or more processors and one or more computer-readable storage media collectively storing program instructions which, when executed by the one or more processors, are configured to cause the one or more processors to perform a method. The method comprises generating a file system delta visualization representation indicating differences between files of a primary data set and a secondary data set. The file system delta visualization representation is generated by identifying a first group of files that have a modified status and a high priority status, identifying a second group of files that have a modified status and a low priority status, identifying a third group of files that have an unmodified status and a high priority status, identifying a fourth group of files that have an unmodified status and a low priority status, and visually distinguishing, within the file system delta visualization representation, the first, second, third, and fourth groups of files.

The above limitations advantageously enable the visualization of differences between a primary data set (e.g., stored on primary storage) and a secondary data set (e.g., stored on secondary storage). This can enable a user to make a rapid and informed decision whether to recover a primary storage or failover to a replica storage in the event of failure of a storage system. This can reduce expense associated with failure of a storage system. Further, aspects may improve processing efficiency compared to other manners for file system visualization (e.g., where multiple file system views may be needed to be rendered for each respective data set). Further, aspects preserve computing resources by removing the need for manual comparison of replicated/backed-up storage system data. The visualization of different file groups based on modification status and/or priority status provides comprehensive information to a user regarding whether to recover a primary storage or failover to a replica storage in the event of failure of a storage system. Further, aspects accurately convey differences between a primary data set and secondary data set.

Example 14: The limitations of Example 13, where the file system delta visualization representation is a pie chart depicting each of the first, second, third, and fourth groups in respective slices of the pie chart. The above limitations advantageously improve file system visualization by depicting different file groups based on modification status and/or priority status within slices of a pie chart. This enables a user to readily determine the amount (e.g., based on storage size) of files that belong to a given file group, which can enable the user to make a rapid and informed decision whether to recover a primary storage or failover to a replica storage in the event of failure of a storage system.

Example 15: The limitations of any of Examples 13-14, where each slice of the pie chart is sized based on storage size. The above limitations advantageously improve file system visualization by depicting different file groups based on modification status and/or priority status within slices of a pie chart. This enables a user to readily determine the amount (e.g., based on storage size) of files that belong to a given file group, which can enable the user to make a rapid and informed decision whether to recover a primary storage or failover to a replica storage in the event of failure of a storage system.

Example 16: The limitations of any of Examples 13-15, where the file system delta visualization representation is a geometric shape containing a plurality of rows and a plurality of columns, each unique row and column combination corresponding to a cell, wherein each cell corresponds to a storage size, wherein the first group occupies a first number of cells, wherein the second group occupies a second number of cells, wherein the third group occupies a third number of cells, and wherein the fourth group occupies a fourth number of cells. The above limitations advantageously improve file system visualization by depicting different file groups based on modification status and/or priority status within a geometric shape containing a grid of cells, where each cell corresponds to storage size. This enables a user to readily determine the amount (e.g., based on storage size) of files that belong to a given file group, which can enable the user to make a rapid and informed decision whether to recover a primary storage or failover to a replica storage in the event of failure of a storage system.

Example 17: A computer program product comprising one or more computer readable storage media, and program instructions collectively stored on the one or more computer readable storage media, the program instructions comprising instructions configured to cause one or more processors to perform a method according to any one of Examples 13-16. The above limitations advantageously enable a computer program product having program instructions configured to cause one or more processors to perform and realize the advantages described with respect to Examples 13-16.

Example 18: A computer-implemented method comprising generating a file system delta visualization representation indicating differences between files of a primary data set and a secondary data set according to any of Examples 13-16.

Example 19: A computer program product comprising one or more computer readable storage media, and program instructions collectively stored on the one or more computer readable storage media, the program instructions comprising instructions configured to cause one or more processors to perform a method. The method comprises receiving a primary data set and a secondary data set, the secondary data set being a replicated version of the primary data set at a particular point in time. The method further comprises determining a difference between the primary data set and the secondary data set. The method further comprises determining that a condition is met for file system delta visualization. The method further comprises visualizing the difference between the primary data set and the secondary data set within a file system delta visualization representation.

The above limitations advantageously enable the visualization of differences between a primary data set (e.g., stored on primary storage) and a secondary data set (e.g., stored on secondary storage). This can enable a user to make a rapid and informed decision whether to recover a primary storage or failover to a replica storage in the event of failure of a storage system. This can reduce expense associated with failure of a storage system. Further, aspects may improve processing efficiency compared to other manners for file system visualization (e.g., where multiple file system views may be needed to be rendered for each respective data set). Further, aspects preserve computing resources by removing the need for manual comparison of replicated/backed-up storage system data. Further, aspects accurately convey differences between a primary data set and secondary data set.

Example 20: The limitations of Example 19, where the file system delta visualization representation depicts different file names within a 2 dimensional (2D) graphical representation, respective file names occupying an amount of space within the 2D graphical representation, where the amount of space occupied by the respective file names are visually distinguished based on a modified status and a priority status. The above limitations advantageously improve file system visualization by depicting different file names that are visually distinguished based on modification status and/or priority status. This enables a user to readily determine the files that have particular modification/priority statuses, which can enable the user to make a rapid and informed decision whether to recover a primary storage or failover to a replica storage in the event of failure of a storage system.

Example 21: The limitations of Example 19, where the file system delta visualization representation depicts different file classifications within a 2 dimensional (2D) graphical representation, respective file classifications occupying an amount of space within the 2D graphical representation, where the amount of space occupied by the respective file classifications are visually distinguished using visually distinguishing indicators, wherein the file classifications include an unmodified and high priority classification, an unmodified and low priority classification, a modified and high priority classification, and a modified and low priority classification. The visualization of different file groups based on modification status and/or priority status provides comprehensive information to a user regarding whether to recover a primary storage or failover to a replica storage in the event of failure of a storage system.

Example 22: The limitations of Example 21, where the program instructions comprise additional program instructions configured to cause the one or more processors to perform the method further comprising receiving an input command to filter a first file classification and removing the first file classification from the file system delta visualization representation. The above limitations advantageously enable filtering of particular file classifications from a file system delta visualization representation. This can enable a user to remove particular groups of files from the file system delta visualization representation, improving processing efficiency (e.g., removing the need to add file groups that are deemed unnecessary for viewing).

Example 23: The limitations of any of Examples 19-22, where the file system delta visualization representation corresponds to a current delta between the primary data set and the secondary data. The above limitations advantageously enable a user to have a "live" view of changes between a primary and secondary data set.

Example 24: A computer-implemented method comprising receiving a primary data set and a secondary data set, the secondary data set being a replicated version of the primary data set at a particular point in time, determining a difference between the primary data set and the secondary data set, determining that a condition is met for file system delta visualization, and visualizing the difference between the primary data set and the secondary data set within a file system delta visualization representation. The computer-implemented method can perform any limitations within Examples 20-23. The computer-implemented method realizes the improvements of Examples 19-23.

Example 25: A system comprising one or more processors and one or more computer-readable storage media collectively storing program instructions which, when executed by the one or more processors, are configured to cause the one or more processors to perform a method according to any one of Examples 19-23. The above limitations advantageously enable a system comprising one or more processors to perform and realize the advantages described with respect to Examples 19-23.

Example 26: A computer-implemented method, system, or computer program product for file system visualization. The method, system, or computer program product comprises receiving a primary data set and a secondary data set, the secondary data set being a replicated version of the primary data set at a current point in time, determining a difference between the primary data set and the secondary data set, determining that a condition is met for file system delta visualization, and visualizing the difference between the primary data set and the secondary data set within a file system delta visualization representation, where the file system delta visualization representation depicts different file classifications within a 2 dimensional (2D) graphical representation, respective file classifications occupying an amount of space within the 2D graphical representation, where the amount of space occupied by the respective file classifications are visually distinguished using visually distinguishing indicators, where the file classifications include an unmodified and high priority classification, an unmodified and low priority classification, a modified and high priority classification, and a modified and low priority classification. The visualization of different file groups based on modification status and/or priority status provides comprehensive information to a user regarding whether to recover a primary storage or failover to a replica storage in the event of failure of a storage system.

Aspects provide convenient and accurate visualization of difference between files of a primary data set (e.g., stored on primary storage) and a secondary data set (e.g., stored on a secondary storage, such as replicated/back-up storage). Aspects of the present disclosure are utilizable in technical use cases where a storage system includes multiple storage devices. In particular, aspects of the present disclosure can be utilized in storage systems incorporating asynchronous replication.

Referring to FIG. 1, an example network environment is shown, in accordance with embodiments of the present disclosure. The network environment 100 is presented to show one example of an environment where systems and methods in accordance with the disclosure may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as advanced technology attachment (ATA), serial advanced technology attachment (SATA), small computer system interface (SCSI), serial attached SCSI (SAS), Fibre Channel, or the like.

The network environment 100 may, in certain embodiments, include a storage network 108 behind the servers 106, such as a storage-area-network (SAN) 108 or a LAN 108 (e.g., when using network-attached storage). This storage network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

The storage system 110 can include primary storage and secondary storage. Primary storage may include a primary data set and secondary storage may include a secondary data set (e.g., a replicated or back-up data set). The primary storage can be replicated/backed-up to the secondary storage synchronously (e.g., simultaneously) or asynchronously (e.g., the primary storage can be updated first, and the changes made to the primary storage can be replicated to the secondary storage after some delay). Embodiments of the present disclosure can be configured to visualize the difference between the primary data set of the primary storage and the secondary data set of the secondary storage data of storage system 110 at any given point in time. In particular, program instructions (e.g., stored on and executed by servers 106) can be configured to perform aspects of the present by visualizing the difference between the primary and secondary data sets within a file system delta visualization representation.

Figure 2:
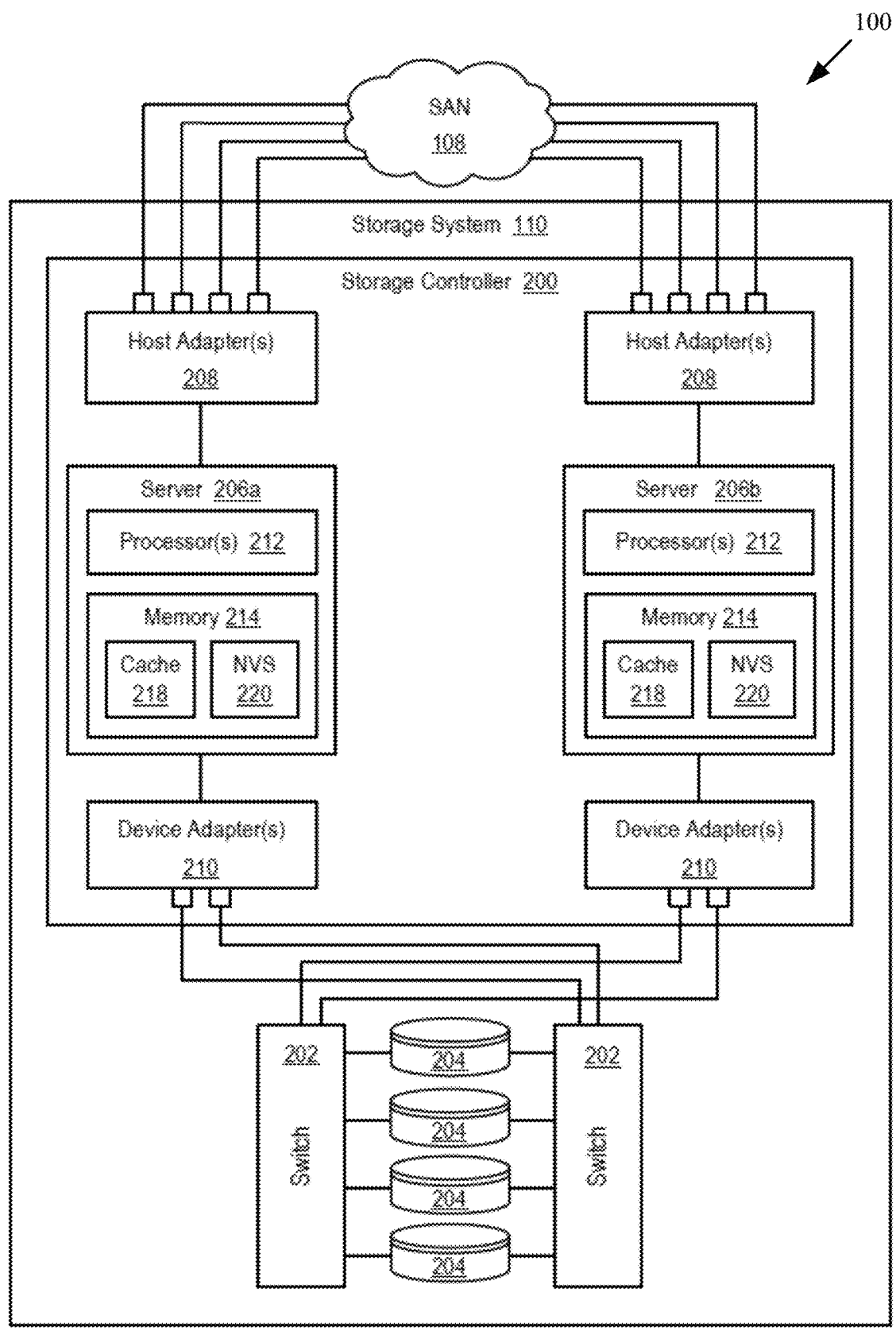
FIG. 2 is a block diagram illustrating an example storage system, in accordance with embodiments of the present disclosure.

Referring to FIG. 2, a storage system 110 containing an array of hard-disk drives 204 and/or solid-state drives 204 is illustrated, in accordance with embodiments of the present disclosure. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204.

In embodiments, each server 206 may include one or more processors 212 and memory 214. The memory 214 may include volatile memory (e.g., RAM) as well as non-volatile memory (e.g., read-only memory (ROM), erasable programmable read-only memory (EPROM), EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it in its cache 218 in the event it is required again. If the data is requested again by a host system 106, the server 206 may fetch the data from the cache 218 instead of fetching it from the storage drives 204, saving both time and resources. Similarly, when a host system performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000® enterprise storage system. The DS8000® is a high-performance, high-capacity storage controller providing disk storage that is designed to support continuous operations. Nevertheless, the systems and methods disclosed herein are not limited to operation with the IBM DS8000® enterprise storage system 110, but may operate with any comparable or analogous storage system 110, regardless of the manufacturer, product name, components, or component names associated with the system 110. Furthermore, any storage system that could benefit from one or more embodiments of the invention is deemed to fall within the scope of the invention. Thus, the IBM DS8000® is presented by way of example and is not intended to be limiting.

The storage drives 204 can be the same as, or substantially similar to, storage system 110 of FIG. 1. That is, storage drives 204 can include primary storage and secondary storage. Primary storage may include a primary data set and secondary storage may include a secondary data set. The primary storage can be replicated/backed-up to the secondary storage synchronously or asynchronously. Embodiments of the present disclosure can be configured to visualize the difference between the primary data set of the primary storage and the secondary data set of the secondary storage data of storage drives 204 at any given point in time. In particular, program instructions (e.g., stored on and executed by servers 206) can be configured to perform aspects of the present by visualizing the difference between the primary and secondary data sets within a file system delta visualization representation.

Figure 3A:
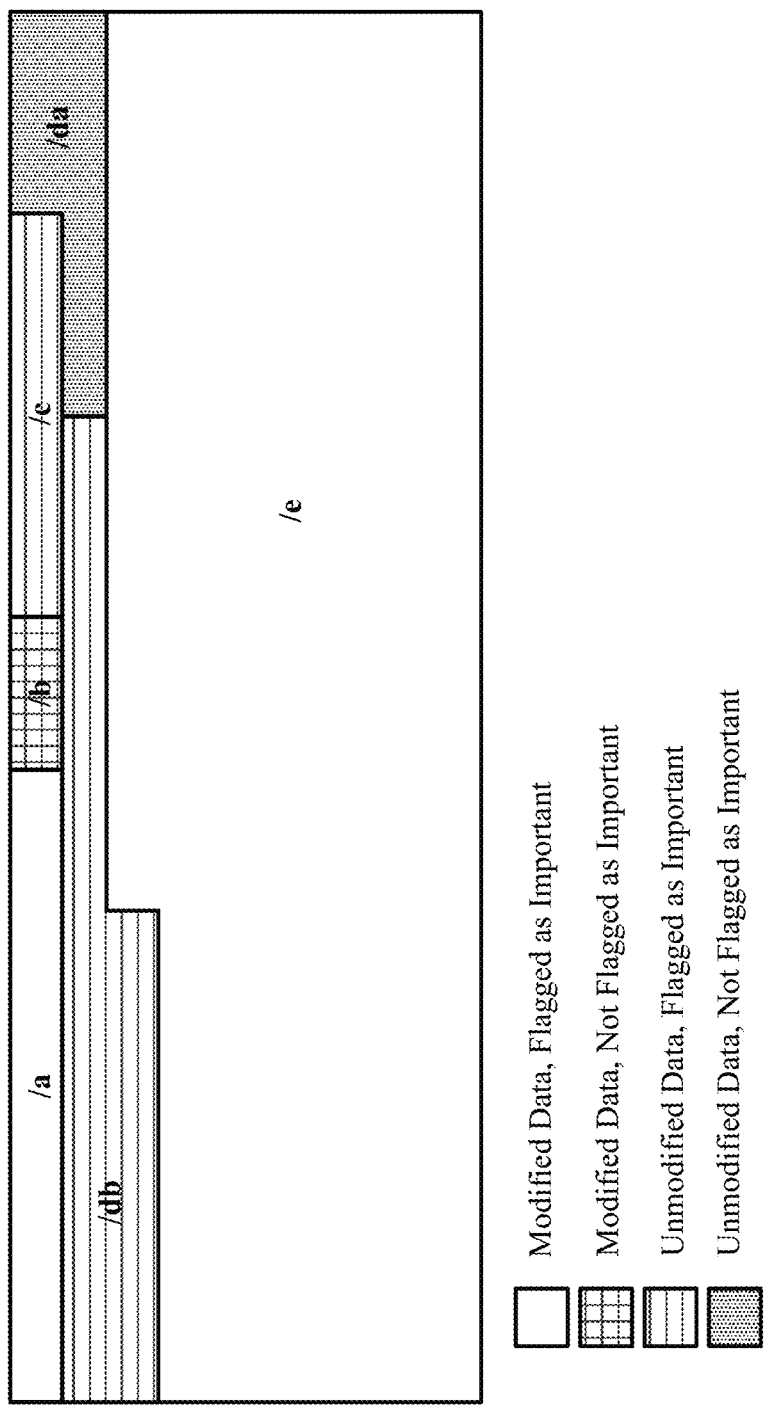
FIG. 3A is diagram illustrating an exemplary file system delta visualization representation, in accordance with embodiments of the present disclosure.

Referring now to FIG. 3A, shown is an example file system delta visualization representation, in accordance with embodiments of the present disclosure. The file system delta visualization representation can depict whether there are differences between files within a primary data set (e.g., stored in a primary storage) and a secondary data set (e.g., stored within a secondary storage such as a replicate storage or back-up storage), as well as the specific files that have been modified.

While the following embodiments depict delta visualization representations within a file system, the same manners for visualization can be applied to other data storage systems, both logical and physical. Logical storage interfaces that delta visualization can be applied to include databases, object stores, and block volumes. Physical storage devices that delta visualization can be applied to include disk and flash drives, redundant array of independent disks (RAID), tape drives, solid state drives, and optical media. Ultimately, delta visualization can be configured to depict differences between a primary data set stored within a primary storage and a secondary data set stored within a secondary storage, regardless of the particular logical/physical storage format/device.

As shown in FIG. 3A, the file system delta visualization representation can be a 2-dimensional (2D) graphical representation. The 2D graphical representation can be a geometric shape, shown as a rectangle in FIG. 3A, though other shapes are contemplated. A plurality of rows and columns can be implemented to divide the geometric shape into cells or pixels, which can correspond to storage space occupied (e.g., based on a number of cells occupied). As shown in FIG. 3A, the file "/a" is depicted within a first row of the geometric shape, while the file "/da" spans two rows within the geometric shape. The files in FIG. 3A are ordered alphabetically based on name in a snake fashion. In the specific embodiment depicted in FIG. 3A, the files are ordered from left to right and right to left in alternating rows from the top to the bottom of the geometric shape. For example, once the first row containing "/a," "/b," "/c," and "da," is full, the next row down (e.g., the second row from the top) begins from right to left (e.g., "/da" spans the first and second rows). However, other manners for ordering the files within FIG. 3A are contemplated.

For example, ordering can occur from left to right and from top down (where upon each upper row being filled, a lower row is next filled from the left to the right), from right to left and from top down (where upon each upper row being filled, a lower row is next filled from right to left), from left to right and from bottom up (where upon each lower row being filled, an upper row is filled from left to right), from right to left and from bottom up (where upon each lower row being filled, an upper row is filled from right to left), from top down and from left to right (where upon each leftward column being filled, a rightward column is filled from top to bottom), from bottom up and from left to right (where upon each leftward column being filled, a rightward column is filled from bottom to top), from top down and from right to left (where upon each rightward column being filled, a leftward column is filled from top to bottom), and from bottom up and from right to left (where upon each rightward column being filled, a leftward column is filled from bottom to top).

Snake fashion ordering can occur in any direction without departing from the spirit and scope of the present disclosure.

For example, though depicted as a left to right and top down snake fashion, snake fashion can occur right to left and top down, left to right and bottom up, right to left and bottom up, top down and left to right (e.g., each column changes directions), top down and right to left, bottom up and left to right, and bottom up and right to left.

The file system delta visualization representation includes a name of each file stored within a file system (e.g., "/a," "/b," "/c," "/da," "/db," and "/e"). In the embodiment depicted in FIG. 3A, the files are ordered alphabetically based on name. However, the files can be ordered based on any other suitable attribute. Other attributes that files within the file system delta visualization representation can be ordered based on include size, time since last update, age, and priority level, among other potential attributes. In some embodiments, files can be ordered based on spatial location within a storage media (e.g., an HDD or SSD). In some embodiments, files may not be ordered at all.

As also depicted in FIG. 3A, the files are visually represented by size. That is, the file "/a" has a first size that is visually represented, the file "/b" has a second size that is visually represented, the file "/c" has a third size that is visually represented, the file "/da" has a fourth size that is visually represented, the file "/db" has a fifth size that is visually represented, and the file "/e" has a sixth size that is visually represented. As shown in FIG. 3A, "/b" is the smallest file and "/e" is the largest file. The size of each file is visually represented based on screen space occupied (e.g., based on a number of cells/pixels occupied within the graphical representation). However, in embodiments, the size of each file can be visually represented in some other manner (e.g., based on color, pattern, shading, etc.). In embodiments, to represent files based on size within the file system delta visualization representation, a mapping (e.g., relationship) between a grid (e.g., cells or pixels) of the file system delta visualization representation and the data size of each file (e.g., in kilobytes (KB), megabytes (MB) or any other data unit) can be established. For example, a 4 MB file may occupy a first number of rows/column or pixels (e.g., 8 cells) within the file system delta visualization representation while an 8 MB file may occupy a second number of rows/column or pixels within the file system delta visualization representation (e.g., 16 cells).

Each file in FIG. 3A has an associated visually distinguishing indicator that depicts a modified status and a priority status. The modified status indicates whether a given file has been updated within a primary data set (e.g., on a primary storage) and not a secondary data set (e.g., a secondary storage such as a replication data set or back-up data set). For example, if a file is indicated as modified, then the file has been updated in the primary data set and not the secondary data set. If a file is indicated as unmodified, then the file has not been updated within the primary or secondary data set.

The priority status indicates a level of importance of a file. For example, files flagged or otherwise designated as "high priority" or "important" are files which have been determined to be significant, whereas files flagged or otherwise designated as "low priority" or "not important" are files which have been determined to not be significant. The priority status of files can be designated in any suitable manner. In some embodiments, priority status is manually defined. Priority status can be set based on how often files are referenced and/or used. Priority status can additionally or alternatively be set based on file type. For example, system files (e.g., files required for operating system use) may be given a relatively high priority compared to application files.

In embodiments, file priority can be designated based on labels or other indicators within each respective file's metadata. Labels applied to files indicating priority can be applied manually by a user or programmatically (e.g., via an application). In some embodiments, a file's fully qualified file name (FQFN) can be used to designate priority. For example, if the FQFN of a file indicates that the file is in a particular subdirectory or matches a particular pattern, a corresponding priority can be determined based on the subdirectory or pattern the FQFN corresponds to. However, priority of specific files can be established in any suitable manner without departing from the spirit and scope of the present disclosure.

In embodiments, priority can be designated by a numerical value (e.g., a value between 0-10). In these embodiments, priority can be determined to be "high," "low," or any other classification (e.g., "medium") based on a comparison between the priority value and one or more priority thresholds. For example, a first priority threshold (e.g., 7 or greater) can indicate that any files satisfying (e.g., exceeding) the first priority threshold are designated with a first priority level (e.g., "high"), a second priority threshold (e.g., between 5-7) can indicate that any files satisfying the second priority threshold are designated with a second priority level (e.g., "medium"), and a third priority threshold (e.g., 5 or less) can indicate that any files satisfying the third priority threshold are designated with a third priority level (e.g., "low").

As shown in FIG. 3A, the file "/a" has a first visually distinguishing indicator that specifies that the file "/a" has a modified status and is flagged as important. File "/b" has a second visually distinguishing indicator that specifies that the file "/b" has a modified status and is not flagged as important. File "/c" has a third visually distinguishing indicator that specifies that the file "/c" has an unmodified status and is flagged as important. File "/da" has a fourth visually distinguishing indicator that specifies that the file "/da" has an unmodified status and is not flagged as important. File "/db" has the third visually distinguishing indicator specifying that the file "/db" has the unmodified status and is flagged as important. File "/e" has the first visually distinguishing indicator specifying that the file "/e" has the modified status and is flagged as important. Accordingly, multiple files can have the same visually distinguishing indicator (e.g., files "/a" and "/e" both have the first visually distinguishing indicator). In embodiments, only a single file may have a given visually distinguishing indicator (e.g., only file "/b" has the second visually distinguishing indicator).

Though the visually distinguishing indicators depicted in FIG. 3A are shown as distinct textures, any other suitable visually distinguishing indicator can be implemented without departing from the spirit and scope of the present disclosure. For example, visually distinguishing indicators can implement colors, shades, tones, shapes, symbols, icons, or any other suitable visually distinguishable indicator. As an example, the first visually distinguishable indicator can be a first color (e.g., blue), the second visually distinguishable indicator can be a second color (e.g., red), the third visually distinguishable indicator can be a third color (e.g., yellow), and the fourth visually distinguishable indicator can be a fourth color (e.g., green). In embodiments, shapes, icons, or other symbols can be inserted into the occupied file space (e.g., in the corner, side, or any other suitable location within the file space within the file system delta visualization representation) to indicate a modified status, priority status, or other file attribute.

The file system delta visualization representation of FIG. 3A can aid users in determining the number of files which have been modified and/or the relative importance of files that have been modified. This can aid users in determining whether to recover a primary storage or whether to failover to a secondary storage. For example, following the example depicted in FIG. 3A, a user may desire to recover the primary storage as the primary storage includes files which are flagged as important that have been modified (e.g., files "/a" and "/e").

It is contemplated that file system delta visualization representation of FIGS. 3A-3B and FIGS. 5A-5B can be completed for virtual files in a virtual file system (VFS). That is, a difference between files in a primary VFS and a secondary VFS can be determined. A virtual file system delta visualization representation can then be generated which depicts changes made to and/or priority of files between the primary VFS and the secondary VFS. In embodiments, a file system delta visualization representation can be generated between a physical file system and a virtual file system (e.g., the primary data set can correspond to a virtual file system and the secondary data set can correspond to a physical file system, and vice versa).

In embodiments, the file system delta visualization representation can be generated even if no changes are made to files between the primary data set and the secondary data set. In these embodiments, the priority of files and/or other features of the files (e.g., size, file type, location, etc.) can still be indicated in a file system delta visualization representation. In embodiments, files that are newly introduced to the primary data set but have not yet been added to the secondary data set can be depicted using a particular visually distinguishable indicator within the file system delta visualization representation.

In embodiments, a user viewing the file system delta visualization representation can be permitted to execute input actions to modify the view of the file system delta visualization representation. For example, the file system delta visualization representation can be configured such that a user can zoom in (e.g., see FIG. 3B) and out of the file system delta visualization representation to further inspect portions of files or subsets of files within the file system delta visualization representation. In instances where the file system delta visualization representation is large (e.g., exceeds the amount of required space to display all files on a given screen space), scrolling features may be enabled allowing the user to scroll across a plurality of files within the file system delta visualization representation. Scrolling down can enable the user to view files further down on the file system delta visualization representation, whereas scrolling up can enable the user to view files further up on the file system delta visualization representation. This may be particularly useful in file system delta visualization representations that include many files or large files. Further, in embodiments, input actions (e.g., hover and/or pointer actions) may be available to a user allowing the user to inspect specific files. For example, hovering over a specific file can display specific attributes of the file. As an example, if a user hovers over file "/a", data such as the file path (e.g., "/home/user/work/a"), last modification time (e.g., 2:02:02 Feb. 2, 2023), size (e.g., 128K), and/or offset (e.g., 502K) can be displayed.

In embodiments, a user may be permitted to filter out particular files and/or classifications (e.g., based on modified/priority statuses) from the file system delta visualization representation. For example, a user may be permitted to enter an input action that filters out files belonging to the category "Modified Data, Not Flagged as Important." This would remove files belonging to the category "Modified Data, Not Flagged as Important" from the view within FIG. 3A. A user may also be permitted to filter out particular files from the file system delta visualization representation. For example, a user may be permitted to filter out file "/db" such that file "/db" is not present within the file system delta visualization representation. Filtering can be applied based on any suitable file characteristic (e.g., priority status, modified status, size, name, etc.). Filtering can be permitted within any of the file system delta visualization representations, such as those depicted within FIG. 3B, FIG. 5A, and FIG. 5B.

It is noted that FIG. 3A is merely an exemplary file system delta visualization representation. The number of files, type of file naming, order of files, size of files, applied visually distinguishable indicators, attributes captured within visually distinguishable indicators, and/or other layout features can vary without departing from the spirit and scope of the present disclosure. Further, different logical/physical storage formats can implement the delta visualization techniques of FIG. 3A without departing from the spirit and scope of the present disclosure.

Figure 3B:
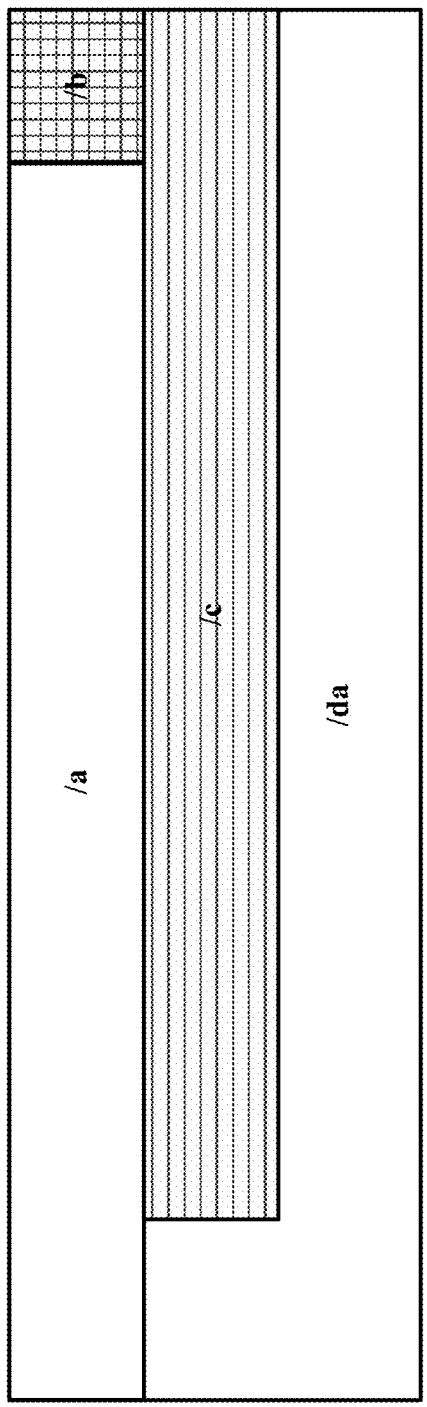
FIG. 3B is a diagram illustrating an exemplary zoomed-in file system delta visualization representation, in accordance with embodiments of the present disclosure.

Referring now to FIG. 3B, shown is a zoomed-in version of the file system delta visualization representation of FIG. 3A, in accordance with embodiments of the present disclosure. As depicted in FIG. 3B, a user may have executed a command (e.g., via an input device (mouse/keyboard) or input mechanism (voice command, gesture command, touch command, etc.)) to cause a zoom action to be performed on the file system delta visualization representation of FIG. 3A leading to the zoomed-in view of FIG. 3B. This can enable users to inspect particular files and portions thereof. This can be particularly helpful when a large number of files are included within a file system delta visualization representation, allowing users to hone in on areas of interest within the plurality of files.

Figure 4:
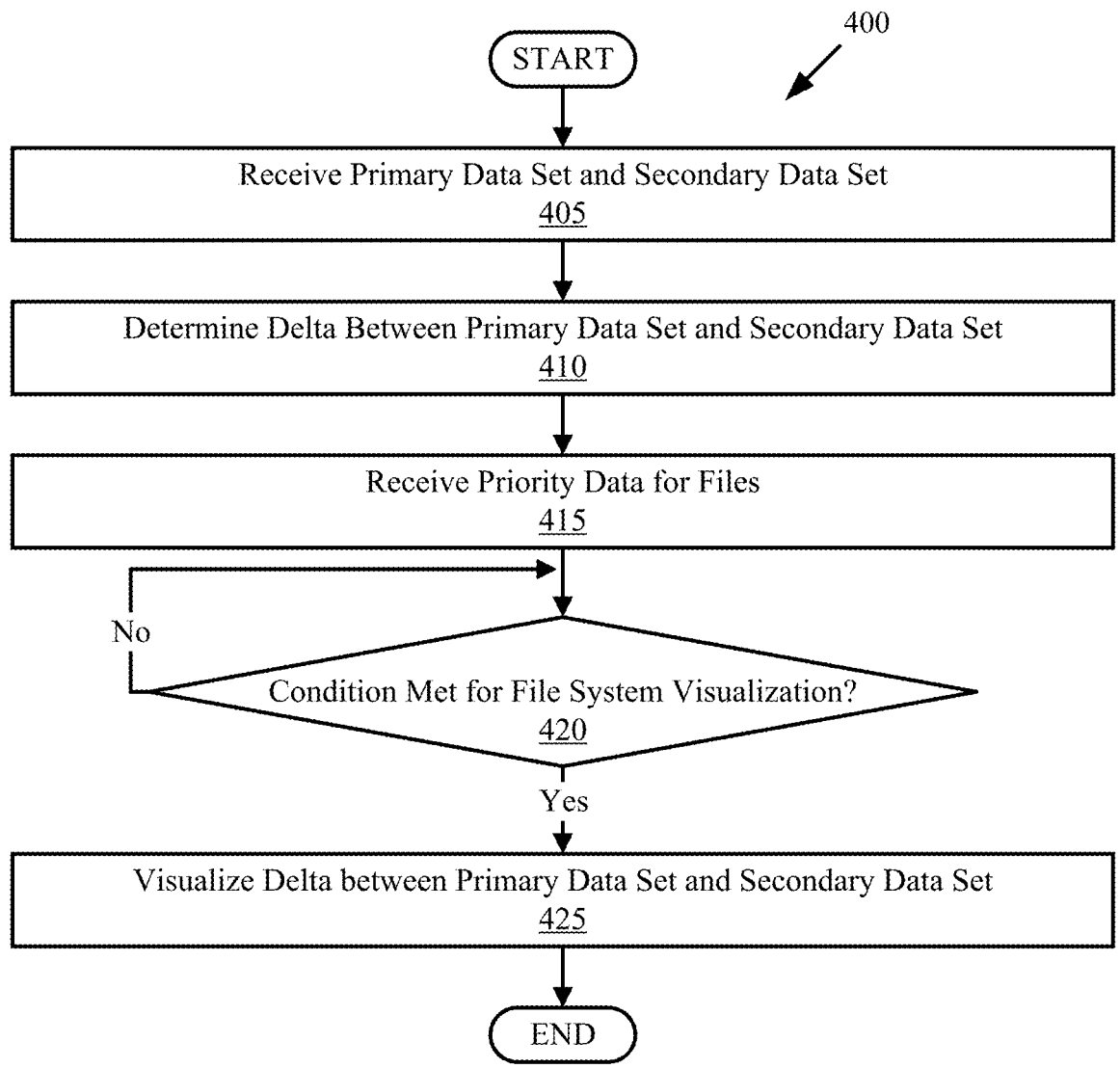
FIG. 4 is a flowchart illustrating an example method for generating a file system delta visualization representation, in accordance with embodiments of the present disclosure.

Referring now to FIG. 4, shown is a flowchart of an example method 400 for generating a file system delta visualization representation, in accordance with embodiments of the present disclosure. One or more operations of method 400 can be completed by one or more processing circuits (e.g., servers 106, clients 102, servers 206, device adapters 210, storage drives 204, storage controller 200, computer 801, end user device 803).

Method 400 initiates at operation 405, where a primary data set (e.g., a primary version of the file system) and a secondary data set (e.g., a replicated or back-up version of the file system) are received. In embodiments, receiving the primary data set and secondary data set can include inspecting, reading, or otherwise viewing the primary and secondary data sets within storage. However, in embodiments, receiving the primary and secondary data sets can include actually receiving the data of the primary and secondary data sets (e.g., over a network).

A delta (e.g., difference) between the primary and secondary data sets is determined. This is illustrated at operation 410. Determining the difference between the primary and secondary data sets can be completed by determining new files added to, files removed from, and/or changes made to files within the primary data set as compared to the secondary data set. Comparison can be completed by comparing snapshots representing the state of the file systems within the primary data set and secondary data set, for example, using a difference command or storage management application functionality. As such, alphanumerical data (e.g., textual data) can be received representing a difference between the primary and secondary data sets. In some embodiments, comparing does not necessarily have to be completed by comparing the full state of the primary data set and the secondary data set. Rather, the changes can be continually monitored over time by tracking data units that have changed between the primary and secondary data sets, such that a full comparison is not necessary.

Priority data for files is then received. This is illustrated at operation 415. Priority data can be set in the same, or a substantially similar manner, as described with respect to FIG. 3A. Priority data indicates the relative importance of each file, which may be indicated via a classification (e.g., "high priority," "medium priority," and "low priority"). The assigned priority classification can be assigned manually, based on file type or other files attributes (e.g., use frequency), or based on a priority value assigned to each file.

A determination is then made whether a condition is met for file system delta visualization. This is illustrated at operation 420. Conditions for initiating file system delta visualization can vary. In embodiments, file system delta visualization can be initiated in response to a user request (e.g., a manual request from a user). In embodiments, file system delta visualization can be initiated in response to an indication that a primary storage system containing the primary data set has downtime (e.g., data corruption, hardware failure, network loss, etc.). This can be completed as a user may desire to view the difference between the primary data set and secondary data set to determine whether to failover to a secondary storage containing the secondary data set or recover the primary data set from primary storage (if possible). In embodiments, file system delta visualization can be initiated in response to a determination that a primary data set and secondary data set vary (e.g., based on determining that a delta exists at operation 410).

In embodiments, a user can be permitted to view the file system delta visualization representation "live" or "historically." That is, a file system visualization representation can be dynamically updated as changes are made such that a user can view the file system delta visualization representation as the changes are occurring (e.g., "live"). In some embodiments, a user can be permitted to view the file system delta visualization representation at a particular point in time in the past (e.g., one hour ago, one day ago, one month ago, etc.).

If a determination is made that a condition is not met for file system visualization, then method 400 may continue with operation 420 until a condition is met for file system visualization. If a determination is made that a condition is met for file system visualization, then the delta between the primary data set and the secondary data set is visualized in a file system delta visualization representation. This is illustrated at operation 425. For example, the file system delta visualization representation depicted in FIG. 3A can be visualized in response to identifying that the condition for file system visualization is met.

The aforementioned operations can be completed in any order and are not limited to those described. Additionally, some, all, or none of the aforementioned operations can be completed, while still remaining within the spirit and scope of the present disclosure.

Figure 5A:
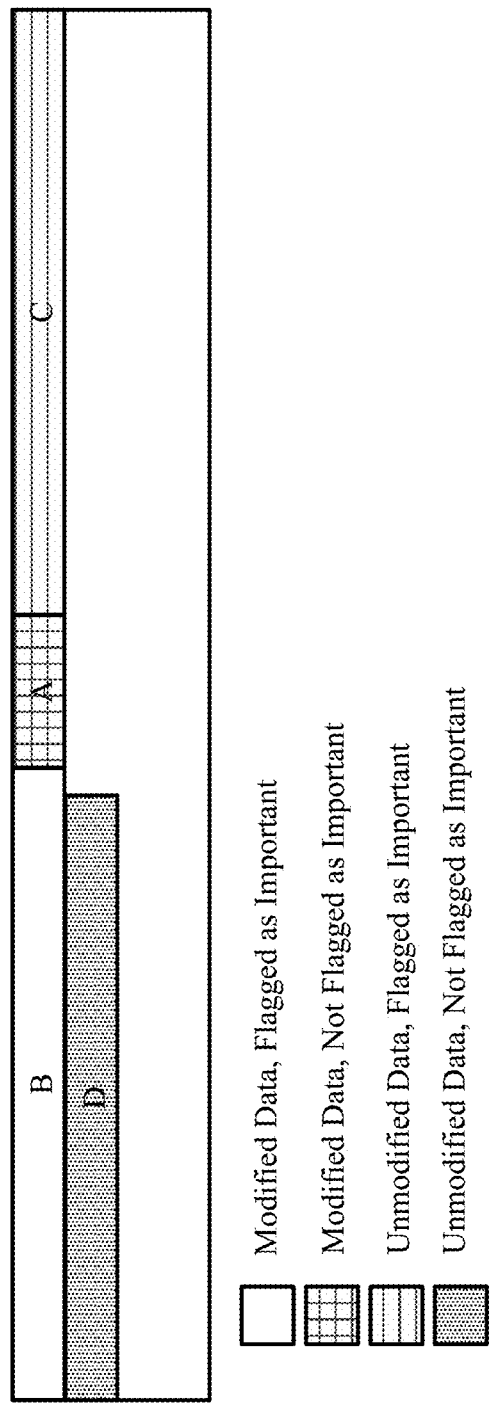
FIG. 5A is a diagram illustrating another exemplary file system delta visualization representation, in accordance with embodiments of the present disclosure.

Referring now to FIG. 5A, shown is another example file system delta visualization representation, in accordance with embodiments of the present disclosure. In contrast with FIG. 3A, FIG. 5A depicts groups of files that belong to a same classification as designated by visually distinguishing indicators, rather than individual files themselves. That is, a first group of files (e.g., one or more files) belong to classification "B," a second group of files belong to classification "A," a third group of files belong to classification "C," and a fourth group of files belong to classification "D." The file system delta visualization representation of FIG. 5A can enable a user to readily determine the number of files or amount of data that belongs to a particular classification. For example, referring to FIG. 3A, rather than visualizing that both files "/a" and "/e" are captured by a same visually distinguishing indicator, in FIG. 5A, both files "/a" and "/e" belong to classification "B." As such, the amount of data displayed in the file system delta visualization representation can be reduced in the view depicted in FIG. 5A.

As depicted in FIG. 5A, files belonging to classification "B" are files that have a modified status (e.g., files that are modified in a primary data set and not in a secondary data set) and are designated with an "important" priority status. Classification "B" is designated with a first visually distinguishing indicator (e.g., a first texture). Files belonging to classification "A" are files that have a modified status and are not designated as "important." Classification "A" is designated with a second visually distinguishing indicator. Files belonging to classification "C" are files that have an unmodified status and are designated with an "important" priority status. Classification "C" is designated with a third visually distinguishing indicator. Files belonging to classification "D" are files that have an unmodified status and are not designated as "important." Classification "D" is designated with a fourth visually distinguishing indicator.

The size of each respective group classification is depicted based on screen space occupied (e.g., a number of cells or pixels occupied) within the file system delta visualization representation, similar to FIG. 3A. For example, a relationship between the amount of space occupied (e.g., number cells or pixels) and the data size of the file group classifications can be established to visually depict the size of each file group. As shown in FIG. 5A, file group "A" is the smallest file group (e.g., by data size, not necessarily number of files) and file group "C" is the largest file group.

The file system delta visualization representation of FIG. 5A can include the various functionalities discussed with respect to FIG. 3A. That is, zoom and/or scrolling functionalities can be permitted to explore/inspect specific file groups (e.g., classifications). In embodiments, input actions (e.g., hover, right-click, left-click) can allow users to inspect file groups. For example, right clicking, hovering over, or otherwise executing an input on file classification "B" within the file system delta visualization representation can enable a user to view the specific files included in group "B" as well as attributes of specific files within group "B."

The file system delta visualization representation of FIG. 5A can aid users in determining the number of files which have been modified and/or the relative importance of files that have been modified. This can aid users in determining whether to recover a primary storage or whether to failover to a secondary storage. For example, following the example depicted in FIG. 5A, a user may desire to recover the primary storage as the primary storage includes files which are flagged as important that have been modified (e.g., represented by group "B").

The file system delta visualization representation view depicted in FIG. 5A is merely exemplary. The number of file groups, type of file group naming, order of file groups, size of file groups, applied visually distinguishable indicators, attributes captured within visually distinguishable indicators, and/or other layout features can vary without departing from the spirit and scope of the present disclosure. Additional or fewer groups depicting different classifications can be included.

Figure 5B:
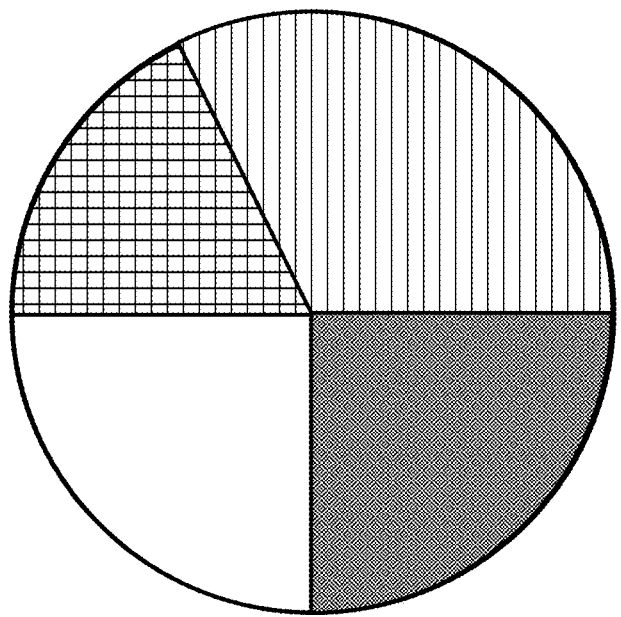
FIG. 5B is a diagram illustrating another exemplary file system delta visualization representation, in accordance with embodiments of the present disclosure.

Referring now to FIG. 5B, shown is another example file system delta visualization representation, in accordance with embodiments of the present disclosure. As depicted in FIG. 5B, the file system delta visualization representation is a pie chart. The pie chart depicts the proportion of files (e.g., based on file size, not necessarily number of files) belonging to different classifications based on modified and priority statuses within each respective pie slice. This file system delta visualization representation can enable a user to readily view the relative proportion of files within an entire system that belong to different classifications in each pie slice. Each classification (e.g., file status based on whether each file is modified and/or based on file priority) is depicted with a different texture within each slice as defined within the legend below the pie chart.

The file system delta visualization representation view depicted in FIG. 5B is merely exemplary. The number of file groups, type of file group naming, order of file groups within slices, size of file groups, applied visually distinguishable indicators, attributes captured within visually distinguishable indicators, and/or other layout features can vary without departing from the spirit and scope of the present disclosure. Additional or fewer groups depicting different classifications can be included within the pie chart.

Figure 6:
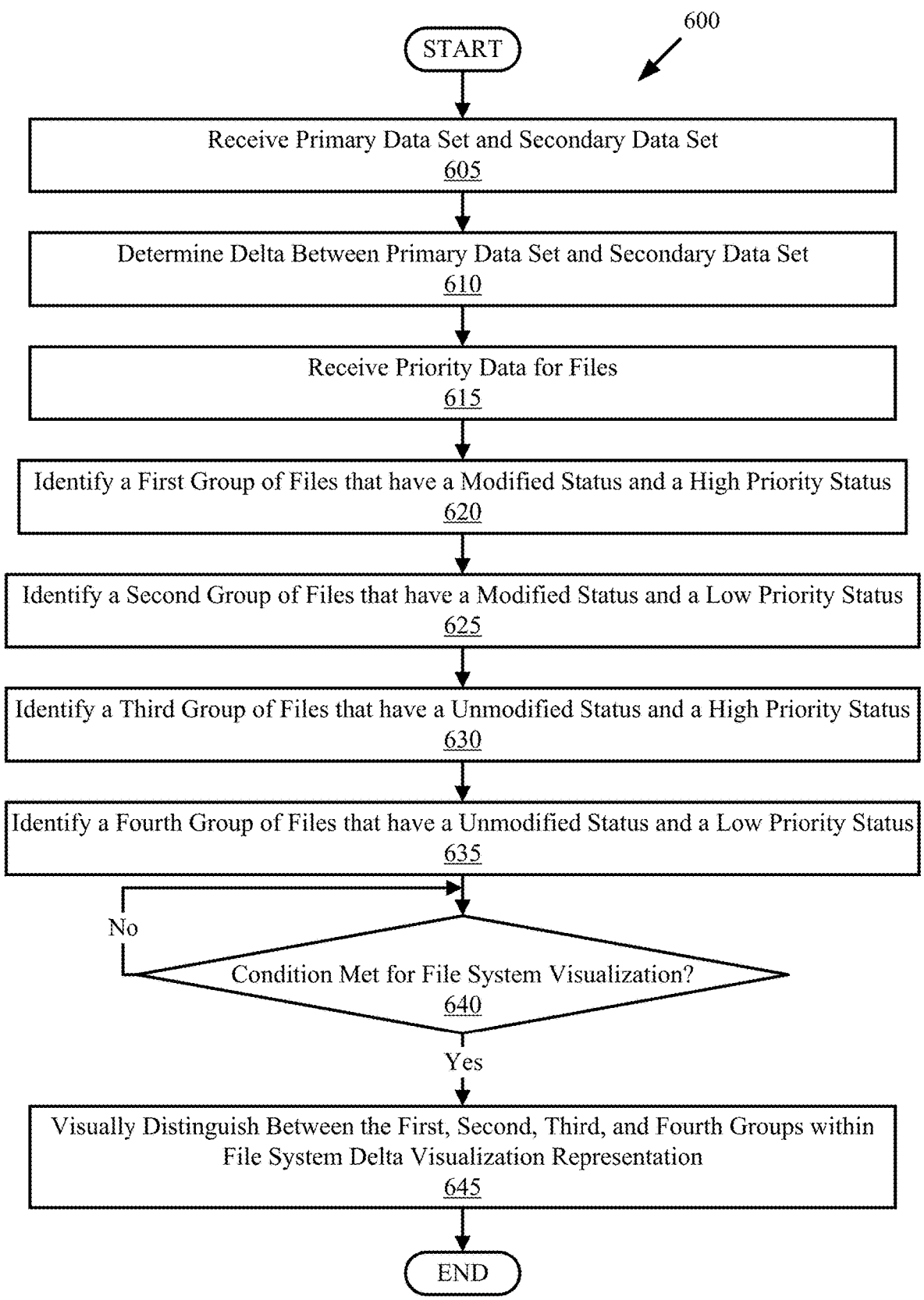
FIG. 6 is a flowchart illustrating another example method for generating a file system delta visualization representation, in accordance with embodiments of the present disclosure.

Referring now to FIG. 6, shown is a flowchart of another example method 600 for generating a file system delta visualization representation, in accordance with embodiments of the present disclosure. One or more operations of method 600 can be completed by one or more processing circuits (e.g., servers 106, clients 102, servers 206, device adapters 210, storage drives 204, storage controller 200, computer 801, end user device 803).

Method 600 initiates at operation 605, where a primary data set (e.g., a primary version of the file system) and a secondary data set (e.g., a replicated or back-up version of the file system) are received. In embodiments, receiving the primary data set and secondary data set can include inspecting, reading, or otherwise viewing the primary and secondary data sets within storage. However, in embodiments, receiving the primary and secondary data sets can include actually receiving the data of the primary and secondary data sets (e.g., over a network).

A delta (e.g., difference) between the primary and secondary data sets is determined. This is illustrated at operation 610. Determining the difference between the primary and secondary data sets can be completed by determining new files added to, files removed from, and/or changes made to files within the primary data set as compared to the secondary data set. Comparison can be completed by comparing snapshots representing the state of the file systems within the primary data set and secondary data set, for example, using a difference command or storage management application functionality. As such, alphanumerical data (e.g., textual data) can be received or generated representing a difference between the primary and secondary data sets. In some embodiments, comparing does not necessarily have to be completed by comparing the full state of the primary data set and the secondary data set. Rather, the changes can be continually monitored over time by tracking data units that have changed between the primary and secondary data sets, such that a full comparison is not necessary.

Priority data for files is then received. This is illustrated at operation 615. Priority data can be set in the same, or a substantially similar manner, as described with respect to FIG. 3A. Priority data indicates the relative importance of each file, which may be indicated via a classification (e.g., "high priority," "medium priority," and "low priority"). The assigned priority classification can be assigned manually, based on file type or other files attributes (e.g., use frequency), or based on a priority value assigned to each file.

A first group of files that have a modified status and a "high priority" status are then determined. This is illustrated at operation 620. Files within the first group (e.g., first classification) have been modified within the primary data set and not the secondary data set and are designated as important files.

A second group of files that have a modified status and a "low priority" status are then determined. This is illustrated at operation 625. Files within the second group (e.g., second classification) have been modified within the primary data set and not the secondary data set and are designated as unimportant files.

A third group of files that have an unmodified status and a "high priority" status are then determined. This is illustrated at operation 630. Files within the third group (e.g., third classification) have not been modified within the primary data set as compared to the secondary data set and are designated as important files.

A fourth group of files that have an unmodified status and a "low priority" status are then determined. This is illustrated at operation 635. Files within the fourth group (e.g., fourth classification) have not been modified within the primary data set as compared to the secondary data set and are designated as unimportant files.

A determination is then made whether a condition is met for file system visualization. This is illustrated at operation 640. Conditions for initiating file system visualization can vary. In embodiments, file system visualization can be initiated in response to a user request (e.g., a manual request from a user). In embodiments, file system visualization can be initiated in response to an indication that a primary storage system containing the primary data set has downtime (e.g., hardware failure, network loss, etc.) or a data loss event (e.g., data corruption or deletion). This can be completed as a user may desire to view the difference between the primary data set and secondary data set to determine whether to failover to a secondary storage containing the secondary data set or recover the primary data set from primary storage (if possible). In embodiments, file system visualization can be initiated in response to a determination that a primary data set and secondary data set vary (e.g., based on the delta determined at operation 610).

In embodiments, a user can be permitted to view the file system delta visualization representation "live" or "historically." That is, a file system visualization representation can be dynamically updated as changes are made such that a user can view the file system delta visualization representation as the changes are occurring (e.g., "live"). In some embodiments, a user can be permitted to view the file system delta visualization representation at a particular point in time in the past (e.g., one hour ago, one day ago, one month ago, etc.).

If a determination is made that a condition is not met for file system visualization, then method 600 may continue with operation 640 until a condition is met for file system visualization. If a determination is made that a condition is met for file system visualization, then the first group, second group, third group, and fourth group are visually distinguished within a file system delta visualization representation. This is illustrated at operation 645. For example, the file system delta visualization representation depicted in FIGS.

5A and/or 5B can be visualized in response to identifying that the condition for file system visualization is met. In embodiments, multiple different file system delta visualization representations can be displayed simultaneously (e.g., adjacent to one another). For example, the file system delta visualization representations of FIGS. 5A and 5B can be displayed simultaneously.

The aforementioned operations can be completed in any order and are not limited to those described. Additionally, some, all, or none of the aforementioned operations can be completed, while still remaining within the spirit and scope of the present disclosure.

Figure 7:
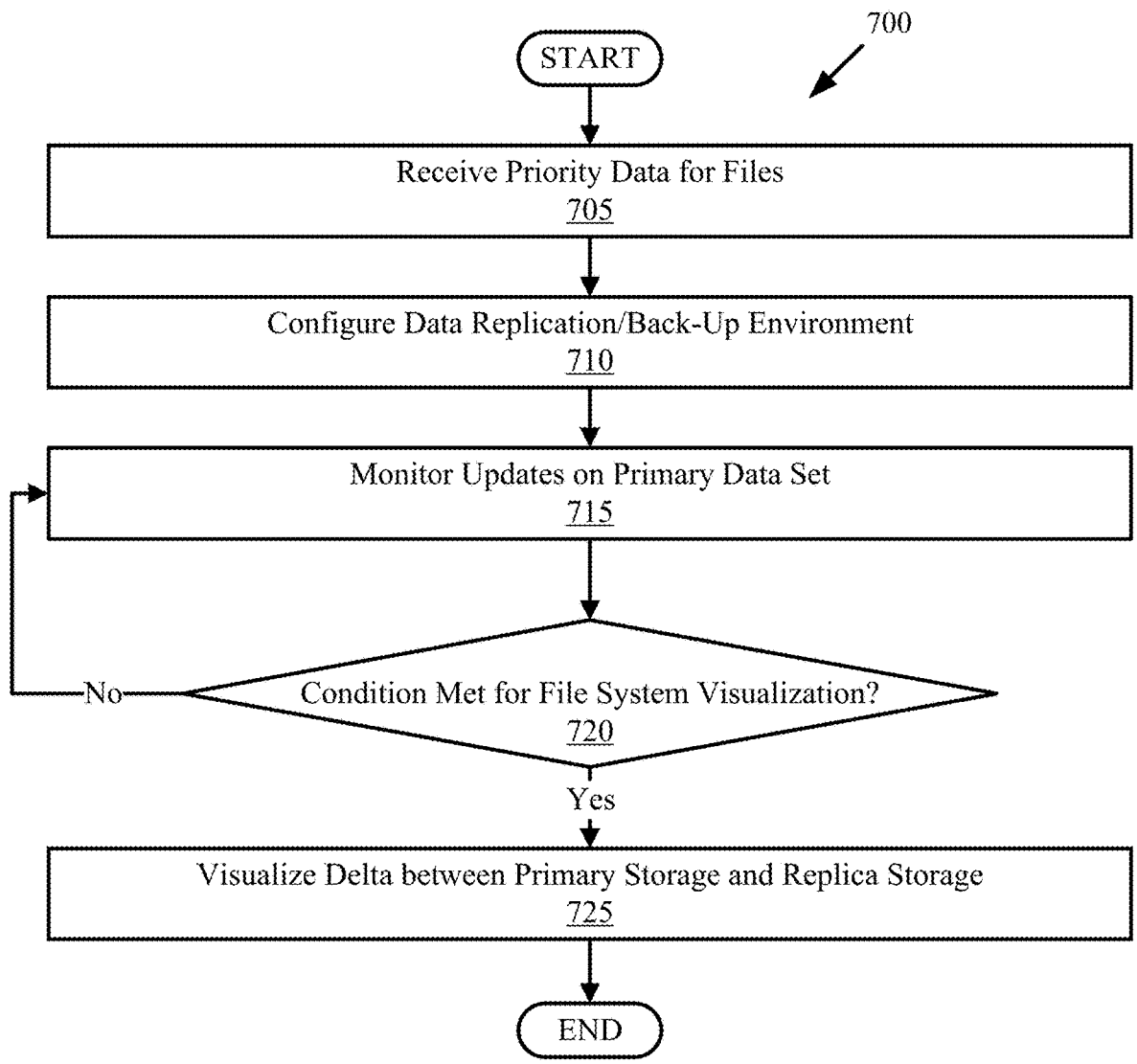
FIG. 7 is a flowchart illustrating an example method for generating a file system delta visualization representation, in accordance with embodiments of the present disclosure.

Referring now to FIG. 7, shown is a flowchart of another example method 700 for generating a file system delta visualization representation, in accordance with embodiments of the present disclosure. One or more operations of method 700 can be completed by one or more processing circuits (e.g., servers 106, clients 102, servers 206, device adapters 210, storage drives 204, storage controller 200, computer 801, end user device 803).

Method 700 initiates at operation 705, where priority data for files is received. Priority data can be the same as, or substantially similar to, priority data described with respect to FIG. 3A. Priority data indicates the relative importance of each file, which may be indicated via a classification (e.g., "high priority," "medium priority," and "low priority"). The assigned priority classification can be assigned manually, based on file type or other files attributes (e.g., use frequency), or based on a priority value assigned to each file.

A data replication/back-up environment is then configured. This is illustrated at operation 710. Data replication is a process where data stored in primary storage is replicated to a secondary storage to provide data redundancy. This can be completed to improve reliability, fault-tolerance, and/or accessibility of data within storage systems. Data back-up is a process where a primary data set is backed-up (e.g., copied) to a secondary location so that it may be used to restore the primary data set if a data loss event occurs. File system delta visualization can be completed in data replication and/or data back-up environments.

Updates on a primary data set (e.g., within a primary storage) are monitored. This is illustrated at operation 715. A determination is made whether a condition is met for file system delta visualization. This is illustrated at operation 720. Conditions for initiating file system visualization can vary. In embodiments, file system delta visualization can be initiated in response to a user request (e.g., a manual request from a user). In embodiments, file system delta visualization can be initiated in response to an indication that a primary storage system containing the primary data set has downtime (e.g., hardware failure, network loss, etc.) or a data loss event. This can be completed as a user may desire to view the difference between the primary data set and secondary data set to determine whether to failover to a secondary storage containing the secondary data set or recover the primary data set from primary storage (if possible). This may also be completed if a user is determining whether to restore the primary data set using a back-up data set (e.g., secondary data set). In embodiments, file system visualization can be initiated in response to a determination that an update is made to the primary data set at operation 715 (e.g., the primary and secondary data sets vary).

In embodiments, a user can be permitted to view the file system delta visualization representation "live" or "historically." That is, a file system visualization representation can be dynamically updated as changes are made such that a user can view the file system delta visualization representation as the changes are occurring (e.g., "live"). In some embodiments, a user can be permitted to view the file system delta visualization representation at a particular point in time in the past (e.g., one hour ago, one day ago, one month ago, etc.).

If a determination is made that a condition is not met for file system visualization, then method 700 may return to operation 715, where updates on the primary data set are monitored until a condition is met for file system visualization. If a determination is made that a condition is met for file system visualization, then a file system delta visualization representation is generated. This is illustrated at operation 725. For example, the file system delta visualization representation depicted in FIGS. 3A-3B and/or FIGS. 5A-5B can be visualized in response to identifying that the condition for file system visualization is met.

The aforementioned operations can be completed in any order and are not limited to those described. Additionally, some, all, or none of the aforementioned operations can be completed, while still remaining within the spirit and scope of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
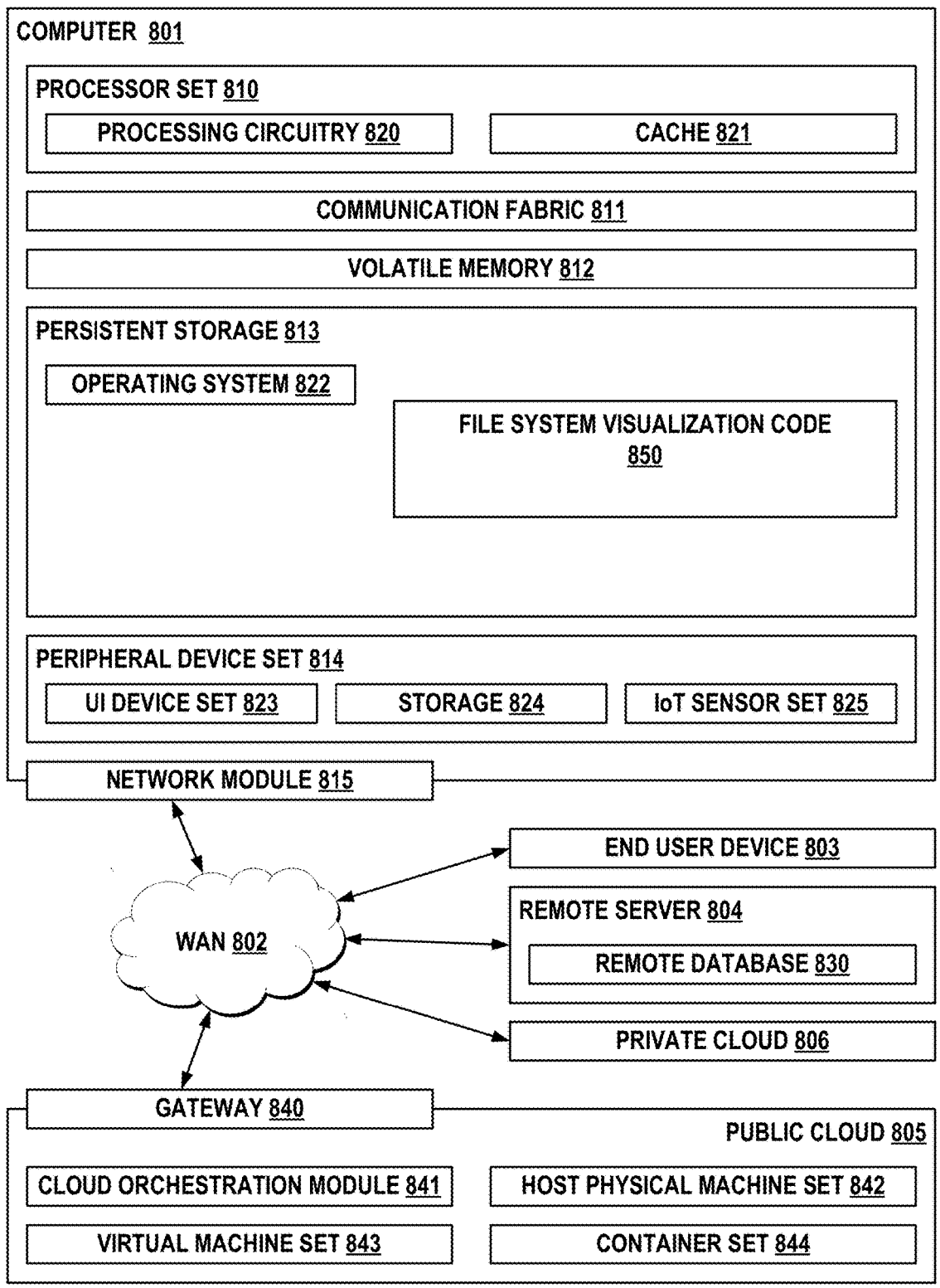
FIG. 8 is a high-level block diagram illustrating an example computer system and network environment that can be used in implementing one or more of the methods, tools, modules, and any related functions described herein, in accordance with embodiments of the present disclosure.

FIG. 8 is a high-level block diagram illustrating an example computing environment 800 that can be used in implementing one or more of the methods, tools, modules, and any related functions described herein, in accordance with embodiments of the present disclosure. Computing environment 800 contains an example of an environment for the execution of at least some of the computer code involved in performing the inventive methods, such as file system visualization code 850. In addition, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and file system visualization code 850, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 641, host physical machine set 642, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/ or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some or all of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in file system visualization code 850 in persistent storage 813.

Communication fabric 811 includes the signal conduction paths that allow the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory 812 is characterized by random access, but this is not required unless affirmatively indicated. In computer 801, the volatile memory 812 is located in a single package and is internal to computer 801, but, alternatively or additionally, the volatile memory 812 may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in file system visualization code 850 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, mixed reality (MR) headset, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A computer-implemented method comprising:
   generating a file system delta visualization representation indicating differences between files of a primary data set and a secondary data set, wherein the file system delta visualization representation is generated by:
   visually representing a size of each file within the file system delta visualization representation;
   displaying a first subset of the files stored within the file system with a first visually distinguishing indicator indicating a modified status, the modified status indicating that files within the first subset of files are modified within the primary data set and not the secondary data set; and
   displaying a second subset of files stored within the file system with a second visually distinguishing indicator indicating an unmodified status, the unmodified status indicating that files within the second subset of files are unmodified within the primary data set and the secondary data set.

2. The computer-implemented method of claim 1, wherein the first visually distinguishing indicator further indicates a first priority status of the first subset of files.

3. The computer-implemented method of claim 2, wherein the second visually distinguishing indicator further indicates a second priority status of the second subset of files.

4. The computer-implemented method of claim 1, wherein files within the file system delta visualization representation are ordered based on at least one file attribute.

5. The computer-implemented method of claim 4, wherein the at least one file attribute is selected from a group consisting of: file name, file size, and last modification time.

6. The computer-implemented method of claim 5, wherein the at least one file attribute is the file name, wherein the file system delta visualization representation is a geometric shape having a plurality of rows and a plurality of columns, each unique row and column combination corresponding to a cell, wherein each cell corresponds to a storage size, and wherein files are alphabetically ordered in a snake fashion within the geometric shape.

7. The computer-implemented method of claim 1, wherein a third subset of files are displayed within the file system delta visualization representation, the third subset of files being new files added to the primary data set but not the secondary data set, the third subset of files displayed with a third visually distinguishing indicator.

8. The computer-implemented method of claim 1, wherein the first visually distinguishing indicator is a first color and wherein the second visually distinguishing indicator is a second color.

9. The computer-implemented method of claim 1, wherein the first visually distinguishing indicator is a first texture and wherein the second visually distinguishing indicator is a second texture.

10. The computer-implemented method of claim 1, wherein the method further comprises:
    receiving a zoom-in input action; and
    redisplaying the file system delta visualization representation with a zoomed in view in response to receiving the zoom-in input action.

11. A system comprising:
    one or more processors; and
    one or more computer-readable storage media collectively storing program instructions which, when executed by the one or more processors, are configured to cause the one or more processors to perform a method comprising:
    generating a file system delta visualization representation indicating differences between files of a primary data set and a secondary data set, wherein the file system delta visualization representation is generated by:
- identifying a first group of files that have a modified status and a high priority status;
- identifying a second group of files that have a modified status and a low priority status;
- identifying a third group of files that have an unmodified status and a high priority status;
- identifying a fourth group of files that have an unmodified status and a low priority status; and
- visually distinguishing, within the file system delta visualization representation, the first, second, third, and fourth groups of files.

12. The system of claim 10, wherein the file system delta visualization representation is a pie chart depicting each of the first, second, third, and fourth groups in respective slices of the pie chart.

13. The system of claim 11, wherein each slice of the pie chart corresponding to each of the first, second, third, and fourth groups are visually distinguished with a different color.

14. The system of claim 13, wherein each slice of the pie chart is sized based storage size.

15. The system of claim 11, wherein the file system delta visualization representation is a geometric shape containing a plurality of rows and a plurality of columns, each unique row and column combination corresponding to a cell, wherein each cell corresponds to a storage size, wherein the first group occupies a first number of cells, wherein the second group occupies a second number of cells, wherein the third group occupies a third number of cells, and wherein the fourth group occupies a fourth number of cells.

16. A computer program product comprising one or more computer readable storage media, and program instructions collectively stored on the one or more computer readable storage media, the program instructions comprising instructions configured to cause one or more processors to perform a method comprising:
- receiving a primary data set and a secondary data set, the secondary data set being a replicated version of the primary data set at a particular point in time;
- determining a difference between the primary data set and the secondary data set;
- determining that a condition is met for file system delta visualization; and
- visualizing the difference between the primary data set and the secondary data set within a file system delta visualization representation.

17. The computer program product of claim 16, wherein the file system delta visualization representation depicts different file names within a 2 dimensional (2D) graphical representation, respective file names occupying an amount of space within the 2D graphical representation, where the amount of space occupied by the respective file names are visually distinguished based on a modified status and a priority status.

18. The computer program product of claim 16, wherein the file system delta visualization representation depicts different file classifications within a 2 dimensional (2D) graphical representation, respective file classifications occupying an amount of space within the 2D graphical representation, where the amount of space occupied by the respective file classifications are visually distinguished using visually distinguishing indicators, wherein the file classifications include an unmodified and high priority classification, an unmodified and low priority classification, a modified and high priority classification, and a modified and low priority classification.

19. The computer program product of claim 18, wherein the program instructions comprise additional program instructions configured to cause the one or more processors to perform the method further comprising:
- receiving an input command to filter a first file classification; and
- removing the first file classification from the file system delta visualization representation.

20. The computer program product of claim 16, wherein the file system delta visualization representation corresponds to a current delta between the primary data set and the secondary data.

* * * * *